United States Patent
Andres

(10) Patent No.: US 6,236,922 B1
(45) Date of Patent: May 22, 2001

(54) AIR BAG ACTUATION EVENT DISCRIMINATION SYSTEM

(75) Inventor: Robert Andres, Troy, MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/461,905

(22) Filed: Dec. 15, 1999

Related U.S. Application Data

(60) Provisional application No. 60/112,404, filed on Dec. 15, 1998.

(51) Int. Cl.[7] .................................................. B60R 21/32
(52) U.S. Cl. ............................ 701/45; 701/46; 307/10.1; 280/735; 180/282
(58) Field of Search ................................ 701/45, 46, 47; 307/10.1; 280/734, 735; 180/282; 340/436, 438

(56) References Cited

U.S. PATENT DOCUMENTS

| | | | |
|---|---|---|---|
| 5,189,311 | * | 2/1993 | Moriyama et al. .................. 307/10.1 |
| 5,225,985 | * | 7/1993 | Okano ................................... 180/282 |
| 5,394,326 | * | 2/1995 | Liu ........................................ 280/735 |
| 5,396,424 | * | 3/1995 | Moriyama et al. .................... 180/282 |
| 5,402,343 | * | 3/1995 | Shibata et al. ......................... 701/46 |
| 5,436,838 | * | 7/1995 | Miyamori .............................. 701/46 |
| 5,542,700 | * | 8/1996 | Shibata et al. ......................... 701/46 |
| 5,546,307 | * | 8/1996 | Mazur et al. .......................... 701/46 |
| 5,668,720 | | 9/1997 | Takahashi et al. . |
| 5,899,946 | * | 5/1999 | Iyoda .................................... 701/46 |
| 5,978,722 | * | 11/1999 | Takasuka et al. ...................... 701/45 |

FOREIGN PATENT DOCUMENTS 0 511 556 A2   11/1992  (EP) .

\* cited by examiner

*Primary Examiner*—Gary Chin

(57) ABSTRACT

A system and method for discriminating between events which warrant deployment of an air bag, and events which do not warrant deployment of an air bag. The air bag system is enabled for deployment only if it has been determined that the deployment enabling criteria have been met.

4 Claims, 5 Drawing Sheets

AIR BAG ACTUATION EVENT DISCRIMINATION SYSTEM

CROSS-REFERENCE TO RELATED APPLICATIONS

This application is a continuation of and claims priority under U.S. provisional application Ser. No. 60/112,404, filed Dec. 15, 1998.

BACKGROUND OF THE INVENTION

1. Technical Field of the Invention

The present invention relates to vehicle air bag systems, and more particularly to a vehicle air bag system and a method for discriminating between events for deploying airbags.

2. Background Information and Description of the Related Art (Including Information Disclosed Under 37 CFR §§1.97 and 1.98)

Air bag systems are well known in the art. Generally, such systems include a sensor that provides a signal which is representative of various impact conditions, and a control unit which evaluates the signals from the sensor and deploys the airbag when a high impact condition is believed to be present. The airbags are mounted within the vehicle cockpit to reduce the likelihood that an occupant may come into forceful contact with the vehicle cockpit during a high impact condition.

One area of concern in airbag systems is the need for systems to discriminate between events that should and should not result in the deployment of one or more of the airbags. A deploy event generally comprises an impact of predetermined severity wherein it is desirable to deploy the airbags, for example a rapid deceleration above a certain threshold speed. A non-deploy event may comprise either relatively low speed impacts, or non-impact events such as heavy braking on a bumpy road. In both situations, it may not be desirable to deploy the airbags. Therefore, it is desirable to provide a vehicle air bag system which is capable of discriminating between deploy events and non-deploy events, and to deploy the airbags accordingly.

BRIEF SUMMARY OF THE INVENTION

The present invention discriminates between deploy and non-deploy events by performing two velocity calculations. The first calculation is performed when a calculation threshold has been met. The second calculation is performed only if the first calculation exceeds a predetermined threshold. If the second calculated velocity exceeds the first calculated velocity before the expiry of a predetermined time period, the system is allowed to issue an airbag deploy command. It should be noted that the deploy command may be further based upon additional deployment criteria not necessary for an understanding of the present invention.

BRIEF DESCRIPTION OF THE SEVERAL VIEWS OF THE DRAWINGS

The present invention may be better understood by referencing the following description in conjunction with the drawings, in which.

DETAILED DESCRIPTION OF THE INVENTION

Figure 1:
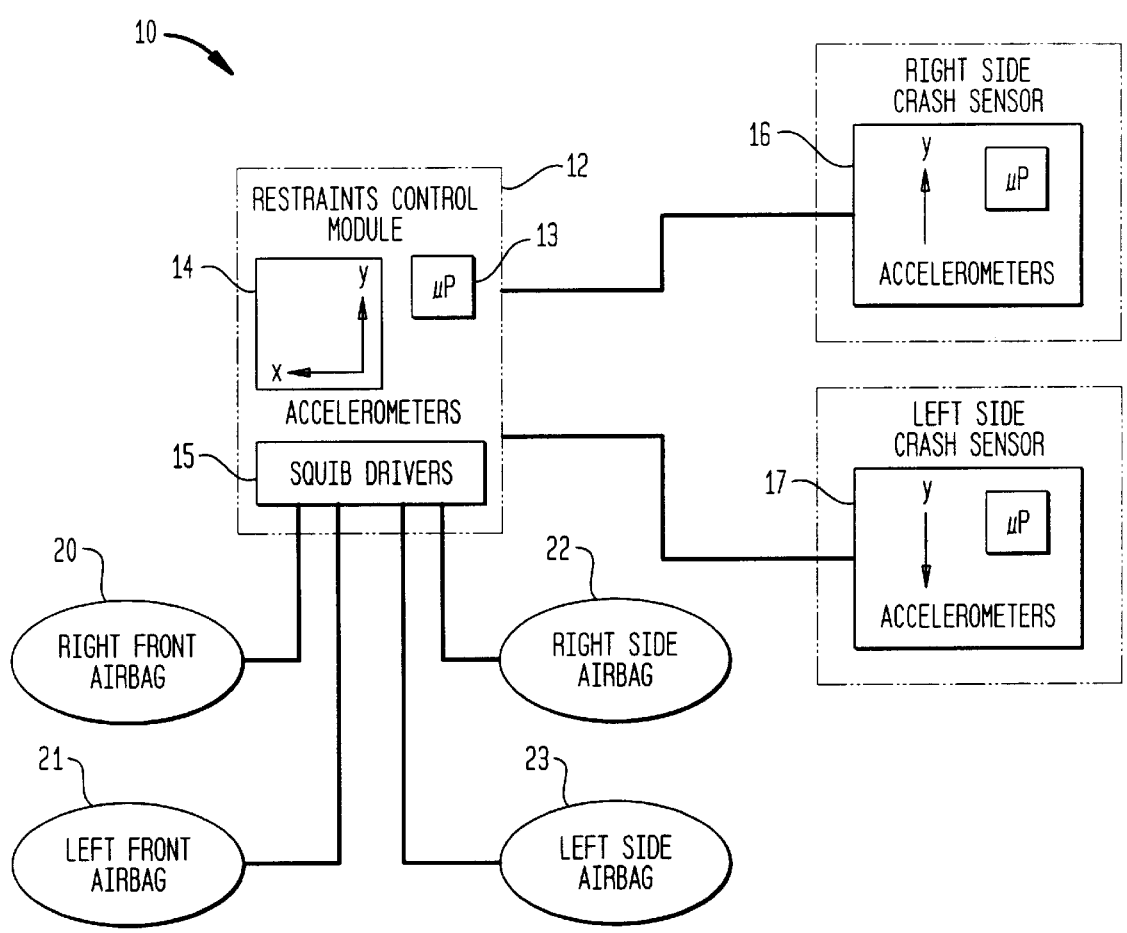
FIG. 1 illustrates a vehicle air bag system comprising a plurality of airbags.

FIG. 1 illustrates a system 10 comprising airbags 20–23 that are deployed in response to signals from control module 12. Control module 12 includes accelerometers 14, micro controller 13 and squib drivers 15. Micro controller 13 evaluates the output signals from accelerometers 14 and deploys appropriate airbags 20–23 via squib drivers 15 when the deployment criteria have been satisfied. Micro controller 13 also receives the output signals from side sensors 16 and 17 to deploy side airbags 22 and 23 as desired. The construction and operation of the above-noted elements are known in the art and will not be described in detail here. The present invention modifies this operation by further evaluating the signals from accelerometers 14 and/or from side sensors 16–17 and enabling the deployment of airbags 20–23 when an enabling criterion is satisfied. Once the enabling criterion has been satisfied, control module 12 is able to deploy the airbags when the deployment criteria have been satisfied. The present invention may be added onto an existing vehicle air bag system comprising the above-noted elements by programming the micro controller 13, or by programming other control units, in accordance with the present invention using programming methods known to those in the art.

The present invention evaluates a first velocity and a second velocity calculated from a filtered acceleration signal, and enables deployment of an airbag when the first velocity and second velocity satisfy a predetermined relationship. The acceleration signal is provided by one of the accelerometers 14. In the present embodiment, micro controller 13 enables the deployment of one or more of the airbags 20–23 when the magnitude of the second velocity exceeds the magnitude of the first velocity. After the enabling criterion has been satisfied, micro controller 13 deploys the appropriate one or more of airbags 20–23 when the deployment criteria have been satisfied. Evaluation of the deployment criteria may be performed concurrently with the evaluation of the enabling criterion.

Non-deploy events may be distinguished from deploy events by the relative duration and magnitude of the acceleration signal. Although a non-deploy event may have a high initial acceleration level, that high acceleration level is of relatively short duration. Once the large initial acceleration variations begin to decrease, the magnitude of the acceleration signal diminishes rapidly. By contrast, deploy events tend to have a prolonged period of relatively large acceleration variations. In general, impacts which cause plastic deformation of the vehicle structure exhibit large acceleration variations with increasing or sustained energy over a significant period of time.

In view of the above, the present invention evaluates the acceleration signals from the sensors. The system generates a first velocity signal, and then if sufficient criteria are met proceeds to generate a second velocity signal. The system finds a deployment enabling situation when the magnitude of the second velocity exceeds the magnitude of the first velocity before the expiry of a calculation period. Both the first and second velocity signals are generated from a filtered acceleration signal. The first velocity signal provides an indication of the initial impact velocity; the second velocity signal provides an indication that the impact has a sustained amount of energy for a certain period of time.

The calculation of the first velocity begins when the acceleration signal exceeds a threshold deceleration level. This threshold deceleration level may be adjusted for various vehicle models as desired. The calculation of the second velocity begins, and the calculation of the first velocity is concluded, when two conditions are satisfied. The first condition is that the first velocity has reached a threshold level. The second condition is either that a significant deceleration peak has been reached in the filtered acceleration signal, or that an approximation has been made that the displacement of the occupant has reached a certain displacement threshold.

Reaching the lower threshold value of the first velocity indicates that a sufficiently high velocity change has been detected. The lower threshold value for the first velocity filters out small changes in acceleration that may cause a premature enabling of the airbag deployment and can be set to any desired value.

The detection of a significant deceleration peak in the filtered acceleration signal indicates that a threshold deceleration level has been reached. This may be an indication of vehicle structural plastic deformation in the body caused by an impact.

The second velocity is calculated and compared against the first velocity. The time during which the second velocity is calculated can be varied depending upon the system needs. For example, in the present invention, it has been determined that the decision whether or not to deploy the airbags should occur within 30 ms of the first indication of a possible airbag situation. In other words, the maximum time for calculating the second velocity in this situation should be no more than 30 ms after the deceleration threshold has been exceeded. In this embodiment, the maximum calculation period has been set to 25 ms. The calculation of the second velocity is concluded when the maximum calculation time for the second velocity has expired or when the second velocity would otherwise calculate as a negative value.

Figure 2:
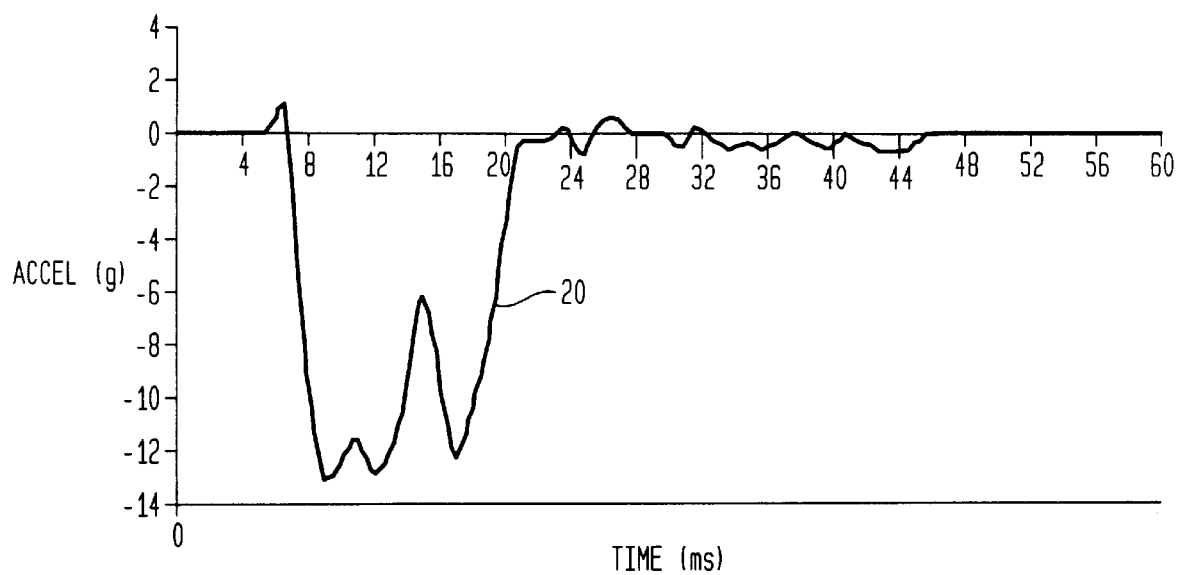
FIG. 2 is a graph of acceleration versus time for a non-deploy event.

FIG. 2 shows the acceleration characteristic of a multiple high acceleration peak event which nonetheless does not warrant deployment of the air bags. Such as event may be a high deceleration move over a rough road. As shown here, the acceleration signal 20 has three significant peaks at or above 12 g's of deceleration.

Figure 3:
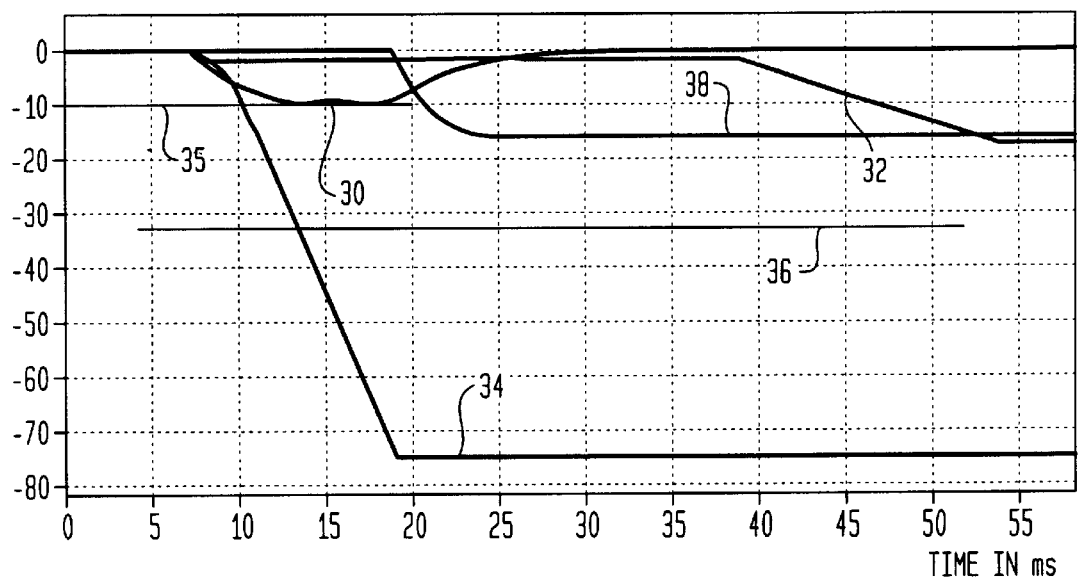
FIG. 3 is a graph of various parameters in accordance with the present invention for the non-deploy event of FIG. 2.

The enabling criterion of the present invention is now described with respect to FIGS. 2 and 3. In FIG. 3, the filtered acceleration signal 30 corresponds to the acceleration signal 20 of FIG. 2. The raw acceleration signal 20 shows three particularly strong acceleration peaks in terms of the magnitude and duration. The filtered acceleration signal 30 is obtained by taking the raw acceleration signal 20 and filtering it using a low pass filter. The operation of a low pass filter is well understood by those of ordinary skill in the art, and therefore will not be described in detail in this description. One of ordinary skill can further appreciate that the low pass filter may be implemented using analog or digital techniques. A low pass filter is used to filter out minor acceleration peaks, such as those shown in FIG. 2 between 24 ms and 46 ms.

The integration line 32 is initially constant at −2 g. This level can be adjusted according to the needs of the particular implementation. Calculation of the first velocity 34 begins when the filtered acceleration signal 30 crosses the integration line 32. The first velocity line 34 represents the area between the integration line 32 and the acceleration signal 30. The integration line thus operates as an offset against filtered acceleration when integrating acceleration to obtain velocity. Until the filtered acceleration exceeds the integration line, the velocity obtained would be negative due to the offsetting effect of the integration line. This is again done for the purpose of filtering out minor acceleration events.

The calculation of the first velocity 34 continues until the filtered acceleration 30 exceeds the deceleration threshold 35, which in this example was set to −10 g and which occurs approximately 18.5 ms after the vehicle began its deceleration. It can be seen that the first velocity 34 has exceeded the velocity threshold 36. At that point, calculation of the second velocity 38 begins and the calculation of the first velocity 34 concludes. The calculation of the second velocity 38 concludes when the acceleration signal 30 crosses the integration line 32 at around 26 ms. The integration line 32 remains constant until about 39 ms, at which point the line slopes downward. The knee point and the slope of the integration line can be adjusted to suit the needs of the particular implementation. The integration line slopes downward after a predetermined time period to reduce the effect of the velocity calculation in the deployment enable criteria. It can be seen that deployment-enabling criterion is not satisfied in FIG. 3 because the magnitude of the second velocity 38 does not exceed the magnitude of the first velocity 34.

Figure 4:
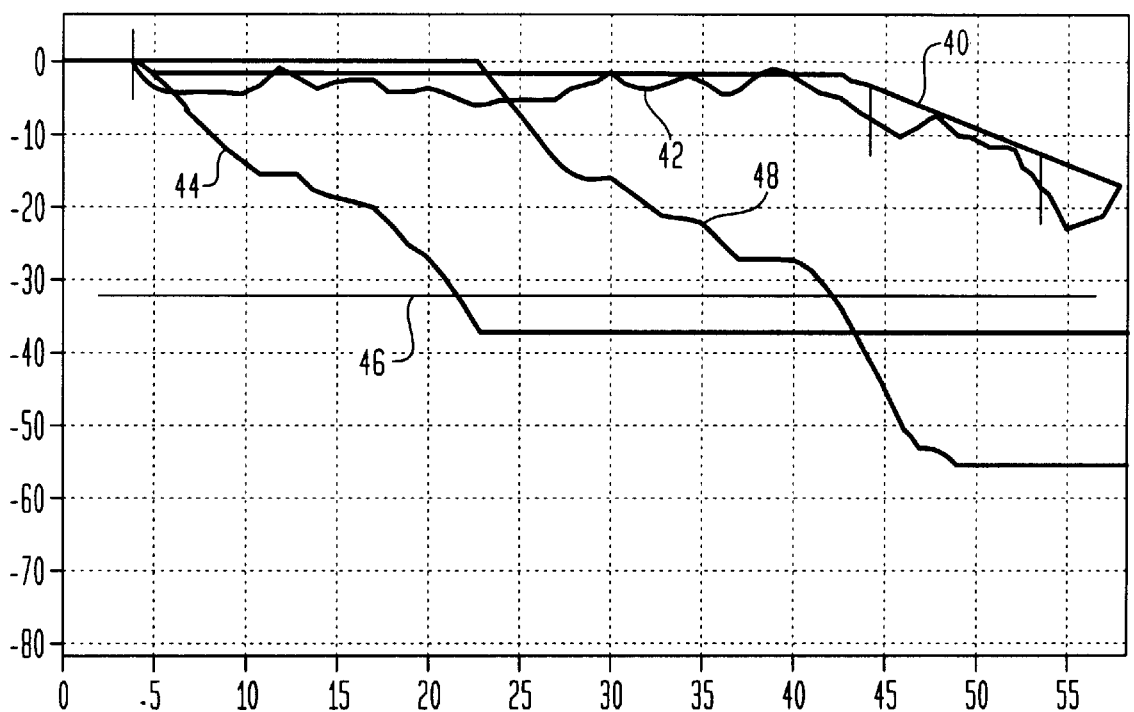
FIG. 4 is a graph of various parameters in accordance with the present invention for a 31-mph front pole impact.

A deploy event is now described with reference to FIG. 4 which corresponds to a 31 mph front pole crash. Again, the integration line 40 initially remains constant at −2 g and then slopes downward, this time at about 44 ms. The filtered acceleration signal 42 includes a number of fluctuations, and a significant peak is detected at about 23 ms. At that time, the first velocity 44 exceeds the lower threshold velocity level 46. As a result, the calculation of the second velocity 48 begins and the calculation of the first velocity 44 is concluded. The second velocity 48 crosses the first velocity 44 at about 43 ms and deployment of the airbags is enabled at that time. The airbags may be deployed thereafter when the deployment criteria have been satisfied.

Figure 5A:
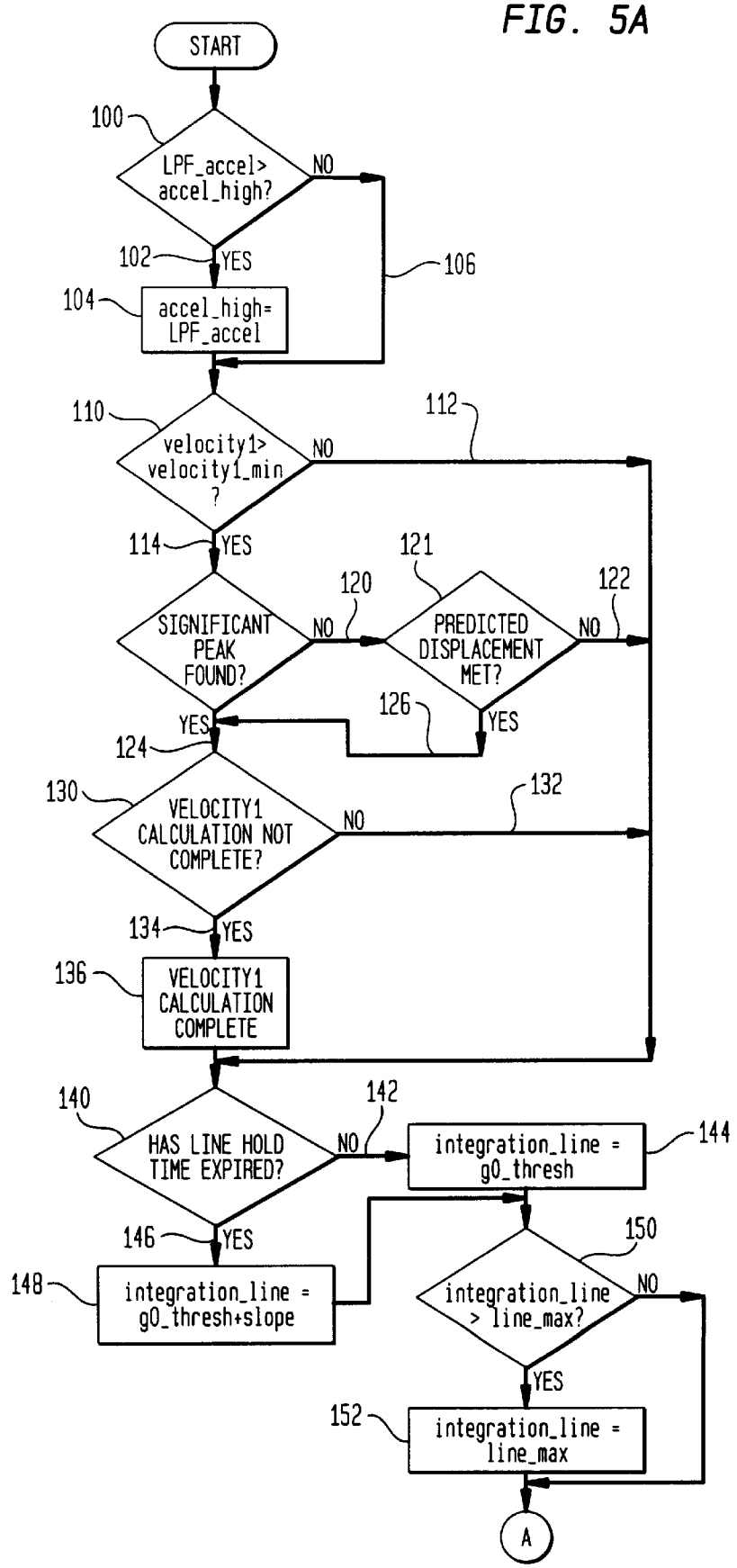
FIGS. 5A and 5B are a flowchart illustrating the steps for discriminating between deploy and non-deploy events according to the present invention.
Figure 5B:
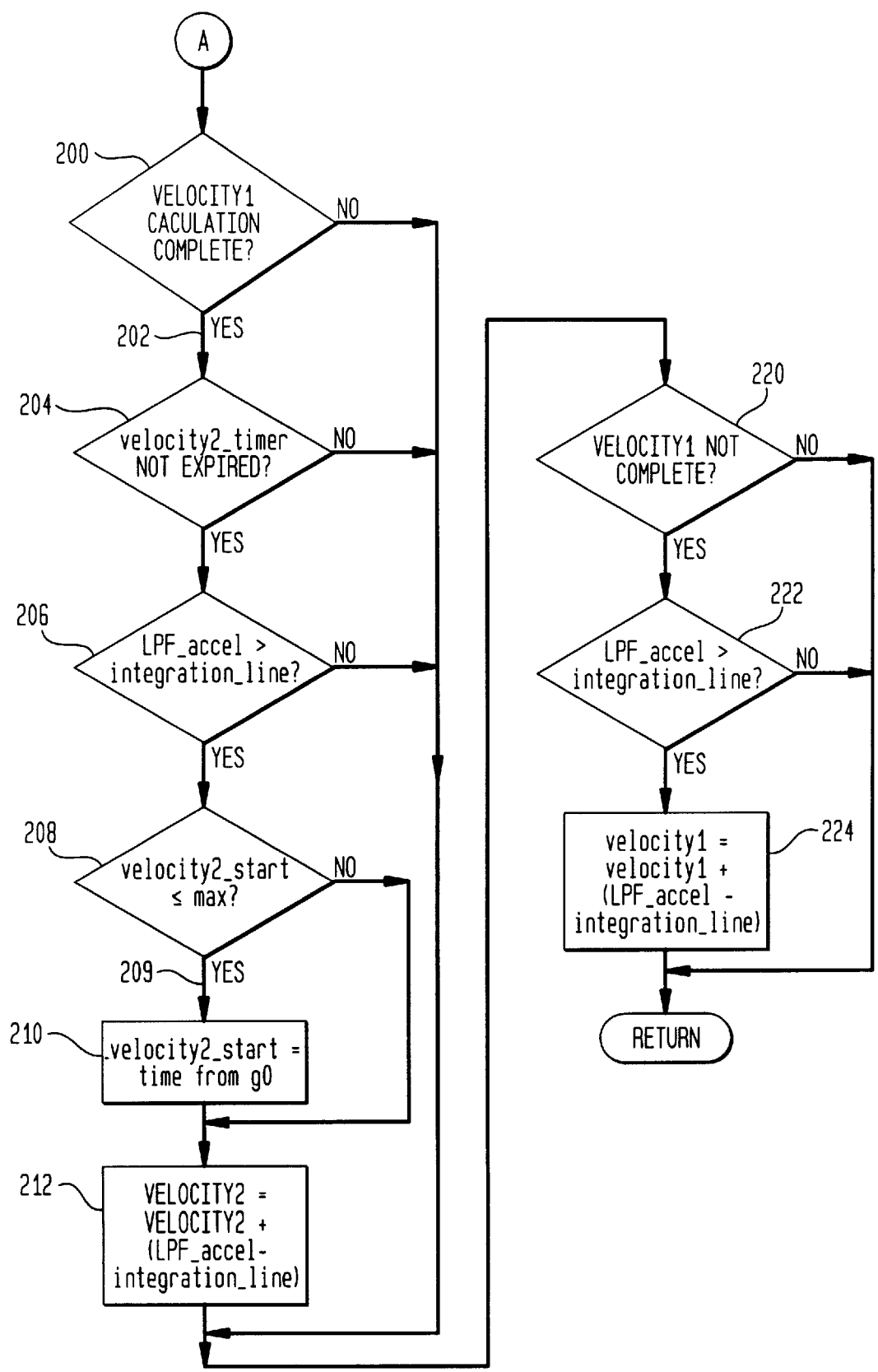

FIGS. 5A and 5B are flowcharts of an algorithm implementing the present invention. Such an algorithm, as well as other algorithms which effect the concepts of the present invention, may be programmed using convention programming means well known to those of ordinary skill.

In step 100, a determination is made whether the filtered acceleration (LPF_accel) exceeds an acceleration tracking variable (accel_high). If the filtered acceleration exceeds this variable 102, the variable (accel_high) is reset to equal the present filtered acceleration value 104. In this way, it can be determined when the filtered acceleration has reached its first peak. Thus, once the filtered acceleration (LPF_accel) no longer exceeds the tracking variable (accel_high) 106, the tracking variable is left alone (accel_high=accel_high) and no further action is taken with respect to changing its value.

In the next step 110, the first velocity (velocity1) is compared against the velocity threshold (velocity1_min). If the threshold has not yet been exceeded 112, calculation of the first velocity continues. However, once the threshold has been exceeded 114, the next series of tasks determine whether or not calculation of the first velocity should cease and the corresponding calculation of the second velocity should commence. First, it is determined whether a significant acceleration peak has been found 118. Such a peak would be found by comparing the filtered acceleration (LPF_accel) to the acceleration threshold (s_peak_detect). If such a peak is not found 120, a second check is performed. In this embodiment, an approximation is made of occupant displacement 121. This approximation is based upon a function of the speed of the vehicle and the time it takes for that vehicle's airbags to deploy, and assumes an unbelted occupant. Here, the acceleration signal is integrated twice to achieve distance, or displacement, of the vehicle over the relevant integration period. This distance is then factored by a predetermined multiplier to approximate the position of an unrestrained mass at some point in the future. This approximate position is compared to an approximation of the future position of the deploying air bag based upon the known deployment velocity of the air bag. If it is approximated 121 that the occupant has not yet been displaced more than a threshold amount 122, then both second velocity calculation triggering criteria have failed and no action is taken. In such a situation, the first velocity continues to be calculated and calculation of the second velocity does not commence. Both of these criteria are designed to approximate the severity of the situation and the need for prompt actuation of the airbags. One of ordinary skill can appreciate that either of these criteria may be used alone, or that additional criteria may be included or substituted.

On the other hand, if either of the second velocity calculation triggers are satisfied, that being either a significant acceleration/deceleration peak has been detected 124, or the occupant has been approximated to have been displaced more than the threshold amount 126, calculation of the first velocity is prepared to be ceased. A simple check is performed 130 to ensure that the flag has not already been set indicating that the first velocity calculation phase has already concluded; if the flag was set during an earlier iteration 132, there is no need to reset it again. However, presuming it had not already been set 134, the flag is now set to indicate calculation of the first velocity has concluded 136.

In the next series of steps, the offset for the second velocity is calculated. As described earlier, the second velocity is the integrated difference between the integration line and the filtered acceleration. The integration line serves as an offset against the filtered acceleration, and is designed to ensure the acceleration phenomenon being experienced is of sufficient magnitude to warrant air bag actuation. The integration line has a constant, or "hold", portion and also has a sloped portion. The point at which the integration line begins sloping occurs at a predetermined time after the commencement of the second velocity calculation, and its relative magnitude is set by software calibration. Thus, in step 140 it is determined whether or not the line hold time has expired. If it has not expired 142, then the integration line should still be constant and it is thus set at its predetermined level of g0_thresh 144. On the other hand, if the line hold time has been exceeded 146, the integration line is sloped. This is accomplished here by simply adding the predetermined slope to the present value 148. Thus, on each iteration, the value of the integration line increases by another increment of magnitude "slope". Steps 150 and 152 check whether or not the iterated magnitude of the integration line has exceeded a predetermined maximum threshold, and if so its value is capped at that threshold. These steps prevent the integration line from becoming such a high offset that it would adversely affect the ability to make meaningful use of the filtered acceleration in calculating the second velocity. The threshold is thus a calibration value that can be adjusted to suit the needs of the particular implementation.

Having thus obtained the present iteration's value for the integration line, calculation of the second velocity now commences. First, a check is made 200 to ensure that calculation of the first velocity (recall steps 110–136) is concluded. Providing that is true 202 a second gateway test is performed. In this step 204, it is determined whether or not it is too late to begin calculation of the second velocity. The timer for the second velocity calculation (velocity2_timer) is based upon a predetermined value that may be set by software calibration. This value may be increased or decreased by the system designer to approximate the point after which it is no longer meaningful to calculate the second velocity. Finally, an integrity check 206 is performed to ensure that the integration line does not exceed the filtered acceleration value. If it did exceed, the calculated velocities would be negative.

Having satisfied the integrity checks 200–206, the next task is to obtain the time at which calculation of the second velocity commences. This value is used to determine the absolute time at which the integration line begins its slope, and is also used to determine the absolute time at which calculation of the second velocity is terminated. As described earlier, the relative magnitude of these two times are predetermined through software calibration. Thus, providing the present time has not exceeded a maximum elapsed time threshold (max) 208, 209, the absolute time at which the second velocity calculation begins is logged 210. The second velocity is calculated, incremented each iteration by the integrated difference between the filtered acceleration and the integration line 212.

The value of the first velocity is obtained in a similar fashion. Provided the calculation of the first velocity has not concluded 220 (recall steps 110–136), and provided it would not yield a negative number 222, the first velocity is incremented each iteration by the integrated difference between the filtered acceleration and the integration line 224.

The first and second velocity values are used as described earlier to determine whether or not deployment of the air bags should be enabled.

Although the invention has been described by reference to a specific embodiment, it should be understood that numerous changes may be made within the spirit and scope of the inventive concepts described. Accordingly, it is intended that the invention not be limited to the described embodiment, but that it includes all modifications encompassed within the spirit of the following claims.

I/we claim as follows:

1. A system for enabling actuation of a vehicle occupant protection device, said occupant protection device actuated by an actuation signal, said system comprising:

a sensor adapted to provide at least one acceleration signal; and a controller coupled to said occupant protection device and said sensor, said controller performing an evaluation of said at least one acceleration signal and enabling said actuating signal in response to said evaluation, said evaluation comprising the steps of:

generating a first velocity signal;

comparing said first velocity signal to a velocity threshold;

generating a second velocity signal when said first velocity signal exceeds said velocity threshold; and enabling said actuating signal if said second velocity signal exceeds said first velocity signal.

2. The vehicle occupant protection system of claim 1, wherein said evaluation performed by said controller further comprises the steps of:

comparing said sensor signal to an acceleration threshold;

generating said first velocity signal only when said sensor signal exceeds said acceleration threshold;

comparing said first velocity signal to said velocity threshold;

generating said second velocity signal when said first velocity signal exceeds said velocity threshold; and enabling said actuating signal if said second velocity signal exceeds said first velocity signal.

3. The vehicle occupant protection system of claim 1, wherein said evaluation performed by said controller further comprises the steps of:

generating said first velocity signal as a function of said at least one acceleration signal and a predetermined offset; and generating said second velocity signal as a function of said at least one acceleration signal and said predetermined offset and, after expiry of a predetermined calculation period, also as a function of an incremental offset.

4. The vehicle occupant protection system of claim 2, wherein said evaluation performed by said controller further comprises the steps of:

generating said first velocity signal as a function of said at least one acceleration signal and a predetermined offset; and generating said second velocity signal as a function of said at least one acceleration signal and said predetermined offset and, after expiry of a predetermined calculation period, also as a function of an incremental offset.

* * * * *